US012573012B2

(12) United States Patent
Cole-Rhodes et al.

(10) Patent No.: US 12,573,012 B2
(45) Date of Patent: Mar. 10, 2026

(54) METHOD AND SYSTEM FOR DEBLURRING NON-UNIFORMLY BLURRED IMAGES

(71) Applicant: Morgan State University, Baltimore, MD (US)

(72) Inventors: Arlene Cole-Rhodes, Bel Air, MD (US); Greig Richmond, Severn, MD (US)

(73) Assignee: Morgan State University, Baltimore, MD (US)

( * ) Notice: Subject to any disclaimer, the term of this patent is extended or adjusted under 35 U.S.C. 154(b) by 370 days.

(21) Appl. No.: 18/520,796

(22) Filed: Nov. 28, 2023

(65) Prior Publication Data

US 2024/0177279 A1     May 30, 2024

Related U.S. Application Data

(60) Provisional application No. 63/428,197, filed on Nov. 28, 2022.

(51) Int. Cl.
| | |
|---|---|
| *G06T 5/73* | (2024.01) |
| *G06T 5/20* | (2006.01) |
| *G06T 5/60* | (2024.01) |

(52) U.S. Cl.
CPC ................. *G06T 5/73* (2024.01); *G06T 5/20* (2013.01); *G06T 5/60* (2024.01); *G06T 2207/20056* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 12,400,291 | B2 * | 8/2025 | Pottorff | ................ G06T 3/4046 |
| 2022/0156891 | A1 * | 5/2022 | Chi | ...................... G06N 3/0895 |
| 2023/0013779 | A1 * | 1/2023 | Langoju | ................ G06T 3/4053 |
| 2024/0169542 | A1 * | 5/2024 | Borse | .................... G06V 10/44 |

FOREIGN PATENT DOCUMENTS

| | | | | |
|---|---|---|---|---|
| EP | 3779866 | A1 * | 2/2021 | ............. G06N 3/045 |
| WO | WO-2025176677 | A1 * | 8/2025 | ............. G06V 10/70 |

OTHER PUBLICATIONS

IEEE Transactions on Consumer Electronics; "A Pair of Noisy/blurry Patches-based PSF Estimation and Channel-dependent Deblurring"; Son et al; vol. 57, No. 4, Nov. 2011. (Year: 2011).*

* cited by examiner

*Primary Examiner* — David Ometz
(74) *Attorney, Agent, or Firm* — Whiteford, Taylor & Preston, LLP; Peter J. Davis

(57) ABSTRACT

A patch-based deblurring method to deblur images blurred in a non-uniform manner (e.g., motion blur or camera shake) uses a modified total-variation (TV) minimization algorithm to make a network specifically designed to handle non-uniform blur.

3 Claims, 10 Drawing Sheets

METHOD AND SYSTEM FOR DEBLURRING NON-UNIFORMLY BLURRED IMAGES

BACKGROUND OF THE INVENTION

Field of the Invention

The present invention is directed to methods for deblurring blurred images.

Related Art

Patents in this area applicable to the medical field include U.S. Pat. Nos. 7,440,634, 9,036,905, 8,428,390, and 11,107, 205. U.S. Pat. Nos. 10,074,038, 11,003,988, 10,438,354, and 10,127,659, among others, include methods for image reconstruction as they apply to medical systems, through deep learning techniques. U.S. Pat. No. 8,041,651 describes a system that can employ a model that includes the use of Fourier transforms and subsequent analysis, relating to neurons and neurotransmitters. U.S. Patent Application No. 20190125190 refers to gathering data using Fourier transforms and neural networks in delivering optical coherence tomography.

Among publications, "Deep Algorithm Unrolling for Blind Image Deblurring," by Li et al., describes a neural network for image deblurring. "Blind image deblurring via hybrid deep priors modeling," by Cheng et al., extends to non-uniform blurring. "Blind deconvolution via complementarily structure-aware image smoothing," by Xu et al., describes a convolutional neural network and Fourier transforms to update images.

SUMMARY OF THE INVENTION

A patch-based deblurring method to deblur images blurred in a non-uniform manner (e.g., motion blur or camera shake) is presented. This approach uses a modified total-variation (TV) minimization algorithm to make a network specifically designed to handle non-uniform blur. The invention improves upon the performance of the algorithm unrolling network in cases with non-uniform blur and performs better than or comparably to the SRN-Deblur network, when deblurring the motion blur in the GOPRO dataset.

Accordingly, there is presented according to the invention, a computer implemented method, wherein a blurry image is processed by L consecutive sets of C 3D-convolution filters, where the processed output from each set of filters is used as the input to a neural network layer; wherein the number of sets of filters, L corresponds to the number of layers in the neural network; wherein the last set of outputs of the consecutive filtering process is passed to the input to the first layer of the neural network, the penultimate output from the consecutive filtering process is passed to the second layer of the neural network, and so forth until the first output of the consecutive filtering process is passed to the last layer of the neural network, and wherein C (i.e. eight to twenty-four) 3D-convolution filters make up each set and there are L (i.e. five to twenty) sets of filters corresponding to five to twenty layers of the neural network respectively.

According to a more detailed embodiment of the invention, there is presented according to the invention, a computer-implemented method for removing uniform or non-uniform blur from a blurred image, comprising:

a. using a processor to pass the blurred image through a first set of C 3D-convolutional filters stored on a non-transient computer readable media and trained on a neural network to identify image features that are characteristic of a high-resolution image to produce a first plurality of C filtered images in which potentially high-resolution features are emphasized;

b. using the processor to pass the first plurality of C filtered images through a second set of C 3D-convolutional filters stored on the non-transient computer readable media and trained on the neural network to identify the features to produce a second set of C filtered images;

c. repeating step b with subsequent sets of 3D-convolutional filters stored on the non-transient computer readable media and trained on the neural network to identify the features to produce subsequent sets of filtered images until a final set of C filtered images is produced following a predetermined repetitions of step b;

d. using the processor to pass the final set of C filtered images (denoted $Y^1$) to a first layer of the neural network, inputting to the first layer of the neural network a plurality of delta function filters (initial estimate of a blurring filters) ($K^0$) stored on a non-transient computer readable media, and a filtered image initial estimate ($G^0$), the first layer of the neural network generating a first set of revised estimates of the blurring filters ($K^1$) and a first layer estimate ($Z^1$) of the final set of filtered images ($Y^1$), using an overlapping patch based approach, i. wherein the first set of C revised estimates of the blurring filters ($K^1$) correspond to different, but overlapping regions of the original image (Y), which are fused/assembled into a first layer blurring filter solution, and ii. wherein the first layer of the neural network also fuses/assembles the first revised estimates of the first layer estimate ($Z^1$) of the original image (Y);

e. using the processor to pass a penultimate set of filtered images ($Y^2$) to a second layer of the neural network, inputting to the second layer of the neural network the first set of revised estimates of the blurring filters ($K^1$) and the first set of estimates ($Z^1$), the second layer of the neural network generating a set of second revised estimates of the blurring filters ($K^2$) and a second set of estimates ($Z^2$) of the penultimate set of filtered images ($Y^2$), using the overlapping patch based approach, i. wherein the second set of revised estimates of the blurring filters ($K^2$) correspond to the different but overlapping regions of the original image, and ii. wherein the second layer of the neural network fuses/assembles the second revised estimates of the blurring filter into a second layer blurring filter solution ($K^2$) and a second layer estimate ($Z^2$) of the original images (Y);

f. repeating step e with subsequent layers of the neural network a number of times (L) corresponding to the repetitions of step b to produce a final blurring filter solutions ($K^L$) and a final estimate ($Z^L$) of the original images (Y);

g. using the processor to pass the blurred original image (Y), the first set of 3D-convolutional filters, the final blurring filter solution ($K^L$) and the final estimate ($Z^L$) of the original blurred image (Y) through an inverse filter to produce a final deblurred image X.

According to various embodiments of the invention, no additional information concerning the original blurred image is provided to the processor. According to various further embodiments of the invention the processed output from each of the first set of C 3D-convolution filters, the second set of 3D-convolutional filters and the subsequent sets of convolutional filters, is used as input to a next layer of the neural network, wherein a combined number of the first set of 3D-convolution filters, the second set of 3D-convolutional filters and the subsequent sets of convolutional filters, is equal to a total number of filters in the neural network, wherein a last set of outputs of the subsequent sets of convolutional filters is passed to the first layer of the neural network, an output from a penultimate set of convolutional filters is passed to the second layer of the neural network, and so forth until the output of the first set of convolutional filters is passed to the last layer of the neural network, and wherein C (i.e. eight to twenty-four) 3D-convolution filters make up each set and there are L (i.e. five to twenty) sets of 3D convolutional filters which correspond to five to twenty layers of the neural network respectively.

It should be understood that every combination and sub-combination of element, feature, and step described above and herein is considered to be part of the invention and within the scope of the invention unless explicitly incompatible with one another.

DETAILED DESCRIPTION OF THE PREFERRED EMBODIMENT

A patch-based convolution process divides an image into P overlapping patches, damps the values of borders of the patches using a windowing function w, convolves each patch with a point spread function ("PSF"), and then returns the patch to its original location. If each patch is blurred with the same PSF, a uniformly blurred image will be created. If the PSF for each patch is different, this process will create a nonuniform blur. Using this approach, we can blur an image with different PSF combinations to create a spatially variant blur. By making use of the discrete Fourier transform (DFT), the blur model can be modified to apply to a nonuniform blurred image as follows:

$$Y = \sum_{r=1}^{P} \mathcal{M}_r^{-1}\left(\mathcal{F}^{-1}\left(\mathcal{F}\left(\mathcal{Z}_K\left(K^{(r)}\right)\right)\mathcal{F}\left(\mathcal{M}_r\left(w^{(r)}X\right)\right)\right)\right)$$

where w(r) is a windowing function for patch $r \in [1, P]$.

$M_r$ is an operator to chop the r-th patch from an image, $M_r^{-1}$ is an operator that returns the patch to the image, $\mathcal{F}$ is the discrete Fourier transform (DFT), $\mathcal{F}^{-1}$ is the inverse DFT $\mathcal{Z}_K$ is a zero-padding operator that appends zeros to K(r) (the PSF for patch r) so that its size matches the corresponding image patch size.

Figure 1:
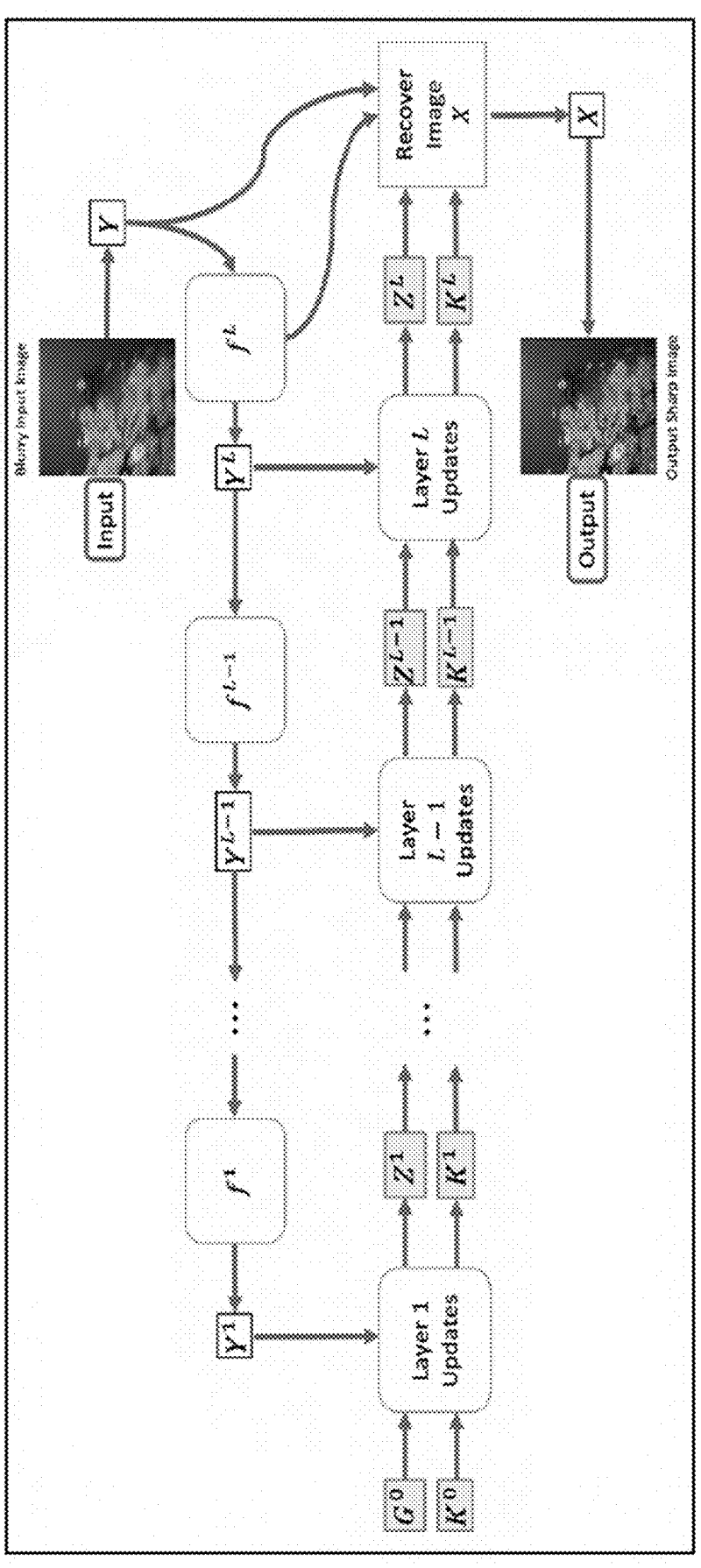
FIG. 1 is a flowchart reflecting representative steps according to an embodiment of the invention.

FIG. 1 shows the windowing, patch isolation, and return process that occurs in the alternative blur model of the present invention. The windowing function, w(r) (i, j) for patch, r plays an important role in this process and needs to be chosen correctly. For any overlap in the image patches, the sum of the weights in the window function for each patch must be equal to one to prevent artifacts in the resultant image. For the windowing function, a Bartlett-Hanning window was chosen with 50% overlap, which was developed by Ha and Pearce and also used by Hirsch et al. In 2D, the windowing function is given by $$w(i, j) = \left(0.62 - 0.48\left|\frac{i}{N_i} - 0.5\right| - 0.38\cos\left(\frac{2\pi i}{N_i}\right)\right) *$$
$$\left(0.62 - 0.48\left|\frac{j}{N_j} - 0.5\right| - 0.38\cos\left(\frac{2\pi j}{N_j}\right)\right)$$

where $N_i$ and $N_j$ is the length of the filters in the i and j direction, respectively. Note that i and j are the indices within the input image.

A uniform deblur can efficiently be removed using a total-variation (TV) deblurring algorithm. The deblurring approach is formulated using the Maximum-a-posteriori (MAP) approach. The problem is formulated in the image gradient domain, as edge features are prominent in the image gradient. In the gradient domain, the blur model in becomes $$\nabla Y = K * \nabla X + \nabla N$$

where $\nabla$ is the gradient operator. Working in the gradient domain, the deblurring problem becomes $$\underset{\{K, G_1, G_2\}}{\text{Minimize}}$$
$$\left\{\frac{1}{2}\left(\|D_x Y - K * G_1\|_2^2 + \|D_y Y - K * G_2\|_2^2\right) + \lambda_1\|G_1\|_1 + \lambda_2\|G_2\|_1 + \frac{\epsilon}{2}\|K\|_2^2\right\}$$

subject to: $\|K\|_1 = 1$ and $K \geq 0$, where $D_x$ and $D_y$ are derivative operators in the horizontal and vertical plane respectively, $\lambda_1$, $\lambda_2$, and $\epsilon$ are positive constant parameters, $G_1$ and $G_2$ are estimates of the gradient of the target sharp image (i.e., estimates of $D_x X$ and $D_y X$ respectively), and the $\geq$ symbol is to be interpreted as elementwise. The first two $l_2$-norms restrict the solution to be generally similar to the blurred image while the $l_1$-norm components restrict the introduction of jitter in the solution by limiting the total variation in the gradient domain. The final $l_2$-norm penalizes large estimates of the PSF.

It is noted that the derivative operators $D_x$ and $D_y$ are commonly implemented using filters that produce the derivative in orthogonal directions. Several works show that it is useful to apply multiple types of filters to extract different types of information from the blurred image and enhance the representation of sparsity. Thus, the derivative filters were generalized to filter the images through a set of C filters, $\{f_i\}_{i=1}^C$ by $$\underset{\{K, \{G_i\}_{i=1}^{C}\}}{\text{minimize}} \left\{ \sum_{i=1}^{C} \left( \frac{1}{2} \| f_i * Y - K * G_i \|_2^2 + \lambda_i \| G_i \|_1 \right) + \frac{\epsilon}{2} \| K \|_2^2 \right\}$$

subject to: $\| K \|_1 = 1$ and $K \geq 0$, where $G_i$, for i=1,2, . . . , and

C is the number of filters used in each layer.

The optimization problem is non-smooth but can be solved with a half-quadratic splitting technique as described. This technique splits the problem by introducing auxiliary variables, $Z_i$ and regularization parameters $\zeta_i$, for i=1, 2, . . . , C to move $G_i$ out of the non-differentiable $l_1$-norm term. The problem then becomes $$\underset{K, \{G_i, Z_i\}_{i=1}^{C}}{\text{minimize}} \left\{ \sum_{i=1}^{C} \left( \frac{1}{2} \| Y_i - K * G_i \|_2^2 + \lambda_i \| Z_i \|_1 + \frac{1}{2\zeta_i} \| G_i - Z_i \|_2^2 \right) + \frac{\epsilon}{2} \| K \|_2^2 \right\}$$

subject to: $\| K \|_1 = 1$ and $K \geq 0$.

Once the problem is split, optimization can be performed by fixing all but one term and optimizing this term, and similarly repeating the optimization process for all other terms. As the cost function converges, the $\zeta_1 \rightarrow 0$.

A solution can be obtained by alternately minimizing over $\{G_i\}_{i=1}^{C}$, $\{Z_i\}_{i=1}^{C}$ and K until convergence. At the I-th iteration, the subproblems are $$G_i^{l+1} \leftarrow \underset{\{G_i^l\}}{\text{Minimize}} \left\{ \frac{1}{2} \| f_i^l * Y - K^l * G_i^l \|_2^2 + \frac{1}{2\zeta_i^l} \| G_i^l - Z_i^l \|_2^2 \right\},$$

for $1 \leq i \leq C$ $$Z_i^{l+1} \leftarrow \underset{\{Z_i^l\}}{\text{Minimize}} \left\{ \frac{1}{2\zeta_i^l} \| G_i^l - Z_i^l \|_2^2 + \lambda_i^l \| Z_i^l \|_1 \right\},$$

for $1 \leq i \leq C$ $$\left| K^{l+1} \leftarrow \underset{\{K^l\}}{\text{Minimize}} \sum_{i=1}^{C} \left( \frac{1}{2} \| f_i^l * Y - K^l * G_i^{l+1} \|_2^2 \right) + \frac{\epsilon}{2} \| K^l \|_2^2 \right.$$

subject to: $\| K \|_1 = 1$ and $K \geq 0$.

When the algorithm is 'unrolled', the optimization subproblems are solved at each layer, 1 of the resulting neural network and the parameters $\zeta_i$ and $\lambda_i$ and the coefficients of the filters, $$f_i^l$$

are learned through training the network. The parameters $$\{\zeta_i^l\}_{i=1}^{C} \text{ and } \{\lambda_i^l\}_{i=1}^{C}$$

are different at each iteration of the algorithm (i.e., each layer of the network). Each iteration/layer, 1 also has a different set of C filters, $$\{f_i^l\}_{i=1}^{C}$$

to filter the blurred image. The filtered versions of the image are denoted Y as $$Y_i^l;$$

when they have been filtered by $$f_i^l;$$

to be concise.

$$Y_i^l = \begin{cases} f_i^l * Y, l = L \\ f_i^l * Y_i^{l-1}, 1 < l < L \end{cases}, \text{ for } 1 \leq i \leq C$$

A sub-problem in a patch-based model is solved by taking Fourier transforms, taking the derivative with respect to $G_i^l$ and then setting the result equal to zero. Using the same notation as before we obtain $$G_i^{l+1} \leftarrow \sum_{r=1}^{P} \mathcal{M}_r^{-1} \left( \mathcal{F}^{-1} \left( \frac{\zeta_i^l \mathcal{F}^* \left( Z_K \left( K^{r^{(r)}} \right) \right) \mathcal{F} \left( \mathcal{M}_r \left( w^{(r)} Y_i^l \right) \right) + \mathcal{F} \left( \mathcal{M}_r \left( Z_i^l \right) \right)}{\zeta_i^l \mathcal{F}^* \left( Z_K \left( K^{r^{(r)}} \right) \right) \mathcal{F} \left( Z_K \left( K^{r^{(r)}} \right) \right) + 1} \right) \right),$$

for $1 \leq i \leq C$ where $\mathcal{F}^*$ is the complex conjugate of the DFT, and w(r) is a windowing function for patch r, and P is the total number of patches. The arithmetic operations here and in subsequent problems are to be interpreted as elementwise unless explicitly stated.

Another sub-problem is a proximal mapping problem applied to each patch's updated filtered image estimate and its solution given as $$Z_i^{l+1} \leftarrow \sum_{r=1}^{P} \mathcal{M}_r^{-1} \left( \text{sgn} \left( \mathcal{M}_r \left( G_i^l \right) \right) \max \left\{ \left( \left| \mathcal{M}_r \left( G_i^l \right) \right| - \zeta_i^l \lambda_i^l \right), 0 \right\} \right),$$

for $1 \leq i \leq C$ where sgn(•) is sign of the element (i.e., +1 or −1). The max operator can be implemented within neural network software with the rectified linear unit (ReLU) function. This is a thresholding operation applied to the new estimates of each patch in $G_i^l$.

The solution for the third sub-problem is approximated in three steps. First, the unconstrained optimization problem is solved, and then the result is manipulated to satisfy the constraints. Once again, the patch-based convolution model and the DFT are used in a manner to obtain $$\overline{K}^{l+1} \leftarrow \sum_{r=1}^{P} \mathcal{M}_r^{-1} \left( \mathcal{F}^{-1} \left( \frac{\sum_{i=1}^{C} \left( \mathcal{F}^* \left( \mathcal{M}_r \left( Z_i^{l+1} \right) \right) \mathcal{F} \left( \mathcal{M}_r \left( w^{(r)} \left( Y_i^l \right) \right) \right) \right)}{\sum_{i=1}^{C} \left( \mathcal{F}^* \left( \mathcal{M}_r \left( Z_i^{l+1} \right) \right) \mathcal{F} \left( \mathcal{M}_r \left( Z_i^{l+1} \right) \right) \right) + \epsilon} \right) \right)$$

The non-negativity constraint is enforced by applying a Softmax thresholding operation (log-sum-exp) to all patches as $$K^{l+1} \leftarrow \sum_{r=1}^{P} \mathcal{M}_r^{-1} \left( \max \left[ \left( \mathcal{M}_r \left( \overline{K}^l \right) - B^l \log \left( \sum_i \exp \left( \mathcal{M}_r \left( \overline{K}^l \right) \right) \right) \right), 0 \right] \right)$$

where $B^l$ is a non-negative parameter which weights the thresholding of PSF coefficients, $K^l$. The unit sum constraint is enforced by normalizing the result by $$K^{l+1} \leftarrow \sum_{r=1}^{P} \mathcal{M}_r^{-1}\left(\frac{\mathcal{M}_r(\overline{K}^{l+1})}{\mathcal{M}_r(\|\overline{K}^{l+1}\|_1)}\right)$$

In blind image deblurring literature, a coarse-to-fine scheme is often used with large filters in the early stages of the algorithm and a transition to smaller filters as the algorithm approaches convergence. This can lead to a large number of parameters, but smaller filters can be used to obtain the same effective receptive field when they are used in consecutive layers. Thus, to achieve the same effect, other methods filter the blurred image with L sets of 3×3 filters saving the feature maps after each convolutional layer. The image after the L-th set of filters is used as input to the first layer of the unrolled network. The input to layer 1 is the filtered output from (L−1+1) sets of consecutive filters. The present invention applies the same approach in the patch-based approach by filtering each image patch. After completing L iterations of the algorithm (passing through L layers of the neural network), an estimate of the PSF at each image patch, $K^L$ and an estimate of the filtered sharp image, $G^L$, are obtained. Using these estimates, the latent sharp image can be estimated by solving $$X \leftarrow \underset{\{X\}}{\text{Minimize}}\left\{\frac{1}{2}\|Y - K^L * X\|_2^2 + \sum_{i=1}^{C}\left(\frac{\eta_i}{2}\|f_i^L * X - G_i^L\|_2^2\right)\right\}$$

where the $\{\eta_i\}_{i=1}^{C} \in \mathbb{R}_+$ are regularization parameters. The solution in a patch-based image model is obtained by again making use of the DFT as $$X \leftarrow \sum_{r=1}^{P} \mathcal{M}_r^{-1}\left(\mathcal{F}^{-1}\left(\frac{\begin{pmatrix}\mathcal{F}^*\left(\mathcal{Z}_K(K^{L^{(r)}})\right)\mathcal{F}(\mathcal{M}_r(w^{(r)}(Y))) + \\ \sum_{i=1}^{C}\eta_i\mathcal{F}^*(f_i^L)\mathcal{F}(\mathcal{M}_r(w^{(r)}(Z_i^L)))\end{pmatrix}}{\begin{pmatrix}\mathcal{F}^*\left(\mathcal{Z}_K(K^{L^{(r)}})\right)\mathcal{F}\left(\mathcal{Z}_K(K^{L^{(r)}})\right) + \\ \sum_{i=1}^{C}\eta_i\mathcal{F}^*(Z_f(f_i^L))\mathcal{F}(Z_f(f_i^L))\end{pmatrix}}\right)\right)$$

Through experimentation, the preferred number of layers (L) in the uniform deblurring network (iterations through the algorithm) needed for adequate deblurring performance was determined to be 10 and the number of filters (C) was determined to be 16. The same values for the L and C parameters are used in the patch-based deblurring network.

At each layer of the flow chart of the proposed algorithm for a blurred input image, Y (see FIG. 1) a set of filters $$\{f_i^l\}_{i=1}^{C}$$

is applied to the input image and its subsequent feature maps, $Y^l$. The "Layer l updates" for l=1 ... L are performed. The final image estimate, X is recovered. The inputs to the network are the blurred image Y, an initial estimate of the PSF, $K^0$ and the filtered sharp image $G^0$.

When this patch-based total-variation (TV) deblurring algorithm is 'unrolled', each iteration of the algorithm becomes a layer of the unrolled network, i.e., each layer of the network is implemented to determine K, an estimate of a deblurring PSF and Z, an estimate of the filtered sharp image. We recover an estimate of the latent sharp image using the estimated PSF, the estimated filtered sharp image, the blurry input image, and $f^L$ (the first filter that was applied to blurry image). The image patches are all deblurred independently of each other and then easily recombined at each update step. To increase the observed receptive field, FIG. 1 shows that the input blurred image is filtered by L consecutive sets of filters before being passed as input to the first layer.

To train the network, the algorithm parameters must be initialized. The filter weights, $$f_i^L$$

were initialized using Xavier initialization and all parameters were updated using the Adam optimizer. Other network specific network parameters were initialized as shown in Table 1. Note that the product of variables $$\lambda_i^l \text{ and } \zeta_i^l$$

are re-parameterized as $$b_i^l$$

for network training. A non-negativity constraint is applied to each of the parameters in Table 1 after each update step. At the start of each pass through the network, the initial estimate of the filtered image, $G^0$ is a set of zero valued images for all patches, and the initial PSF estimate, $K^0$ is set to the delta function for all image patches. Several variations of the patch based deblurring method were created and trained by varying the patch size and the maximum allowable PSF size. The patch size was varied between 100×100, 200×200, and 400×400 pixels each using a maximum PSF size of 21×21 pixels or 45×45 pixels (yielding six variations in total as shown in Table 2).

TABLE 1

Parameter Initialization Values.

| Parameter | Value |
|---|---|
| $b_i^l$ | 0.02 |
| $\zeta_i^l$ | 1.0 |
| $B^l$ | 0.0 |
| $\eta_i$ | 20 |

TABLE 2

Network Variations.

| | Size of the patches | | |
|---|---|---|---|
| | 100 × 100 | 200 × 200 | 400 × 400 |
| Maximum PSF Size | 21 × 21 Net-A | Net-C | Net-E |
| | 45 × 45 Net-B | Net-D | Net-F |

Each network was trained to deblur the images in a uniformly blurred dataset of 800 images; therefore, the blur in each patch is identical but the networks learn by deblurring each patch independently. Each network was trained for 100 epochs measuring the sum of the mean squared error (MSE) loss of both the true PSF at each patch and the true patch of the sharp image. The learning rate for each network was set to $1.0e^{-3}$ and was set to decay by 5% every 5 epochs.

Evaluation of networks was performed by deblurring images from the GOPRO test dataset and Kohler dataset. The GOPRO test dataset is composed of 1,111 blurry and sharp image pairs featuring simulated motion blur (non-uniform), created by averaging consecutive images of the same scene. The Kohler dataset is composed of blurry images that simulate camera shake using twelve different non-uniform blurs each applied to the same four images to yield 48 blurry images.

The deblurring capabilities of the six patch-based networks (Net-A through Net-F) were compared with the SRN-Deblur network of Tao et al. and the DUBLID algorithm of Li et al. The networks were evaluated by determining the peak signal-to-noise ratio (PSNR) and mean structural similarity (MSSIM) of the resulting deblurred images from the Kohler dataset with the results shown in Table 3.

individual objects in the scene moving (sometimes in different directions). This means that the blur can have a high spatial variation and explains why the smaller patch sizes of Net-A and Net-B performed better when deblurring images from the GOPRO dataset while Net-F performed significantly worse than the other networks. The performance of the other test networks (Net-C, Net-D, and Net-E) was also comparable to the SRN-Deblur network even though this network was trained to deblur images which are very similar to the test dataset (i.e., a subset of the GOPRO dataset not used in testing the network).

Figure 2:
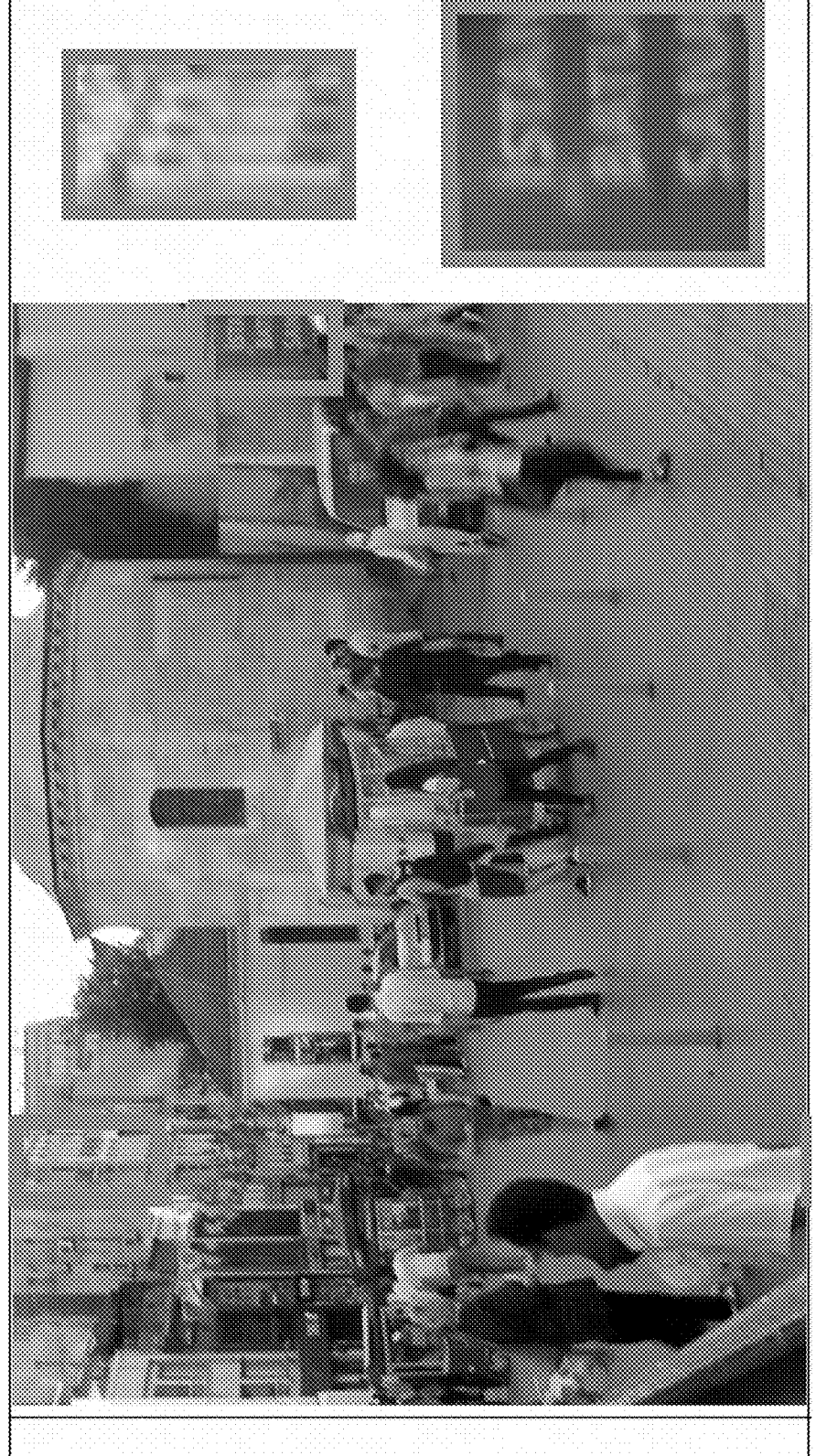
FIG. 2 shows a sample blurry image from the GOPRO dataset.
Figure 3:
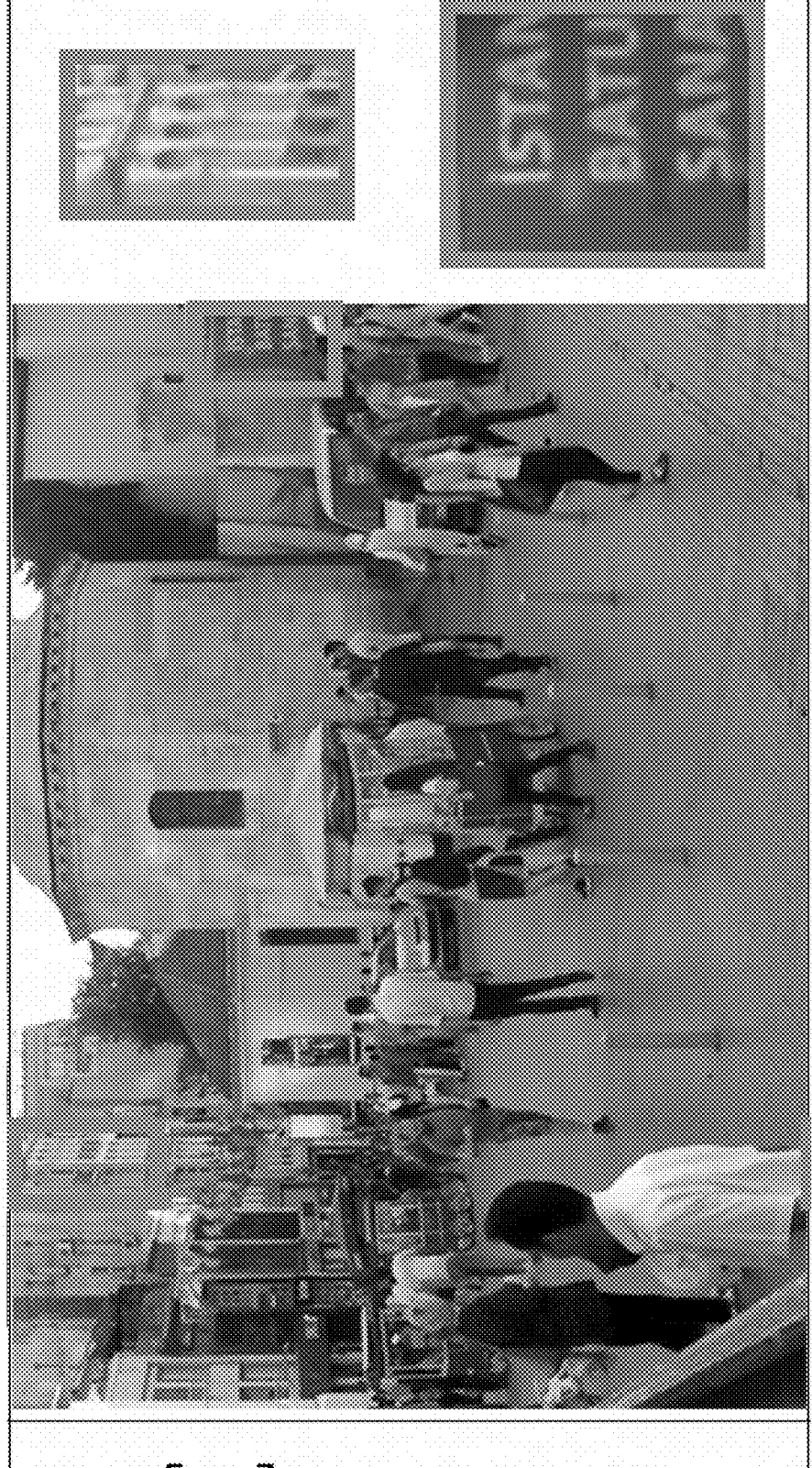
FIG. 3 shows a deblurred image generated using the SRN-Deblur method
Figure 5:
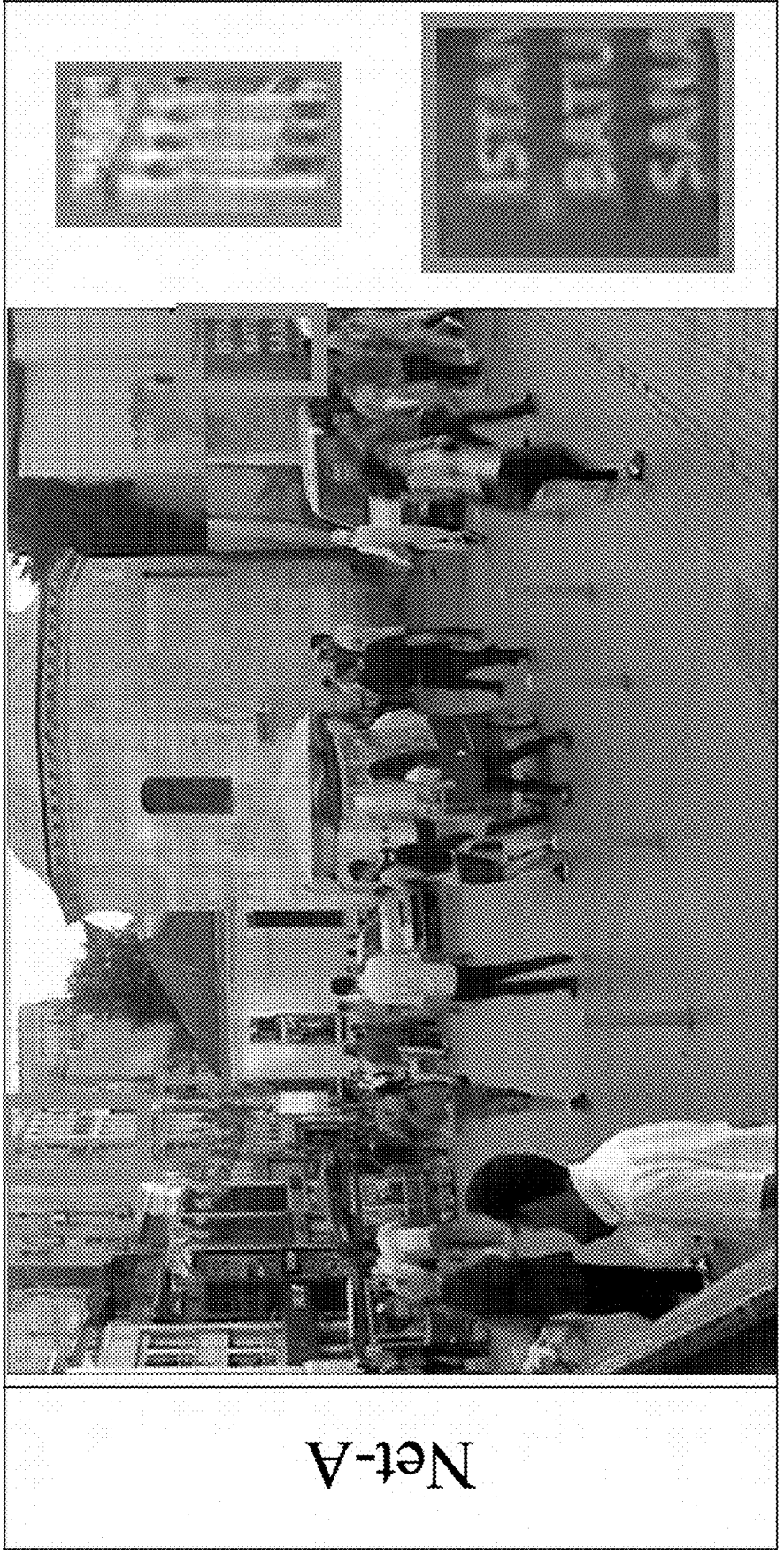
FIG. 5 shows a deblurred image generated using a method according to a first embodiment of the invention.
Figure 6:
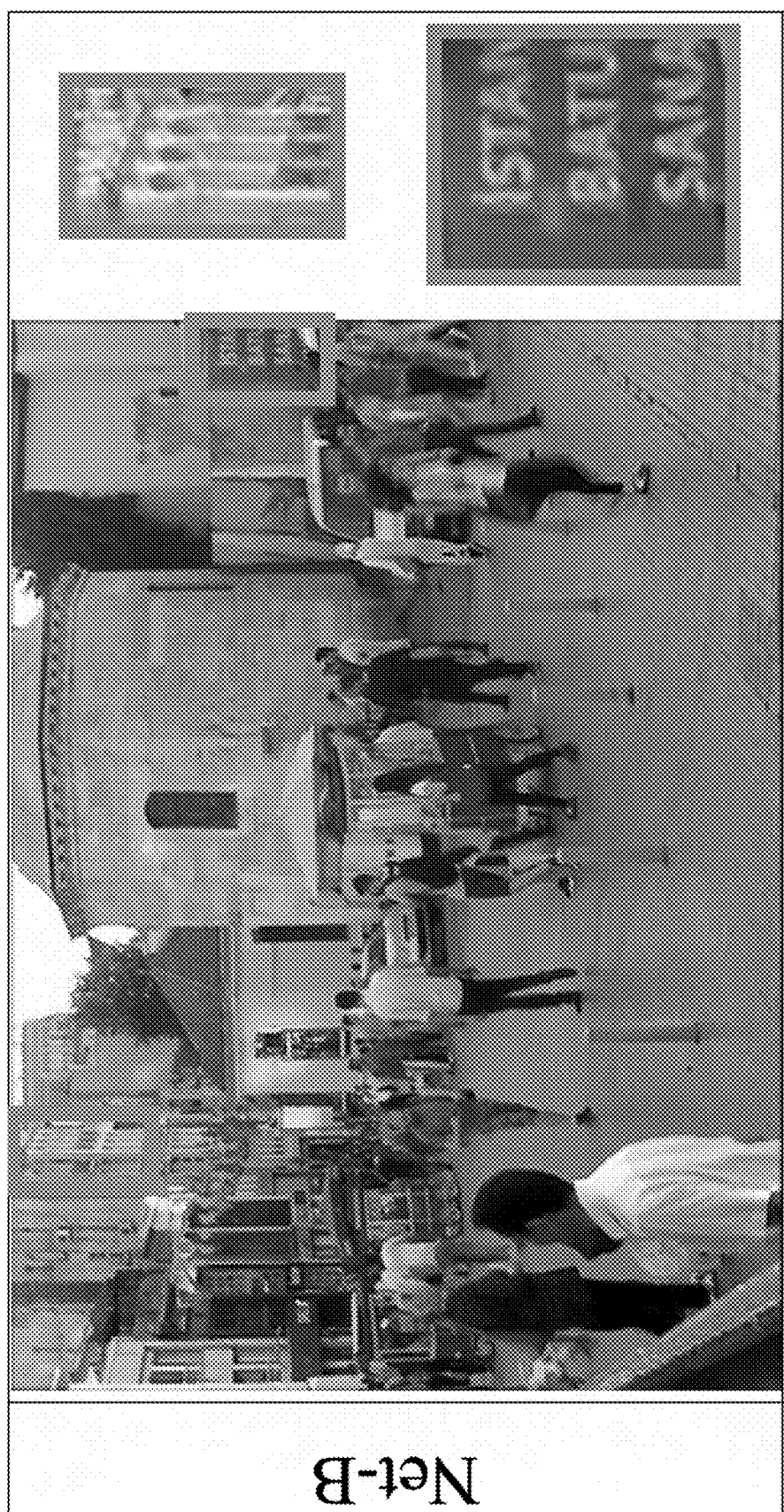
FIG. 6 shows a deblurred image generated using a method according to a second embodiment of the invention.
Figure 7:
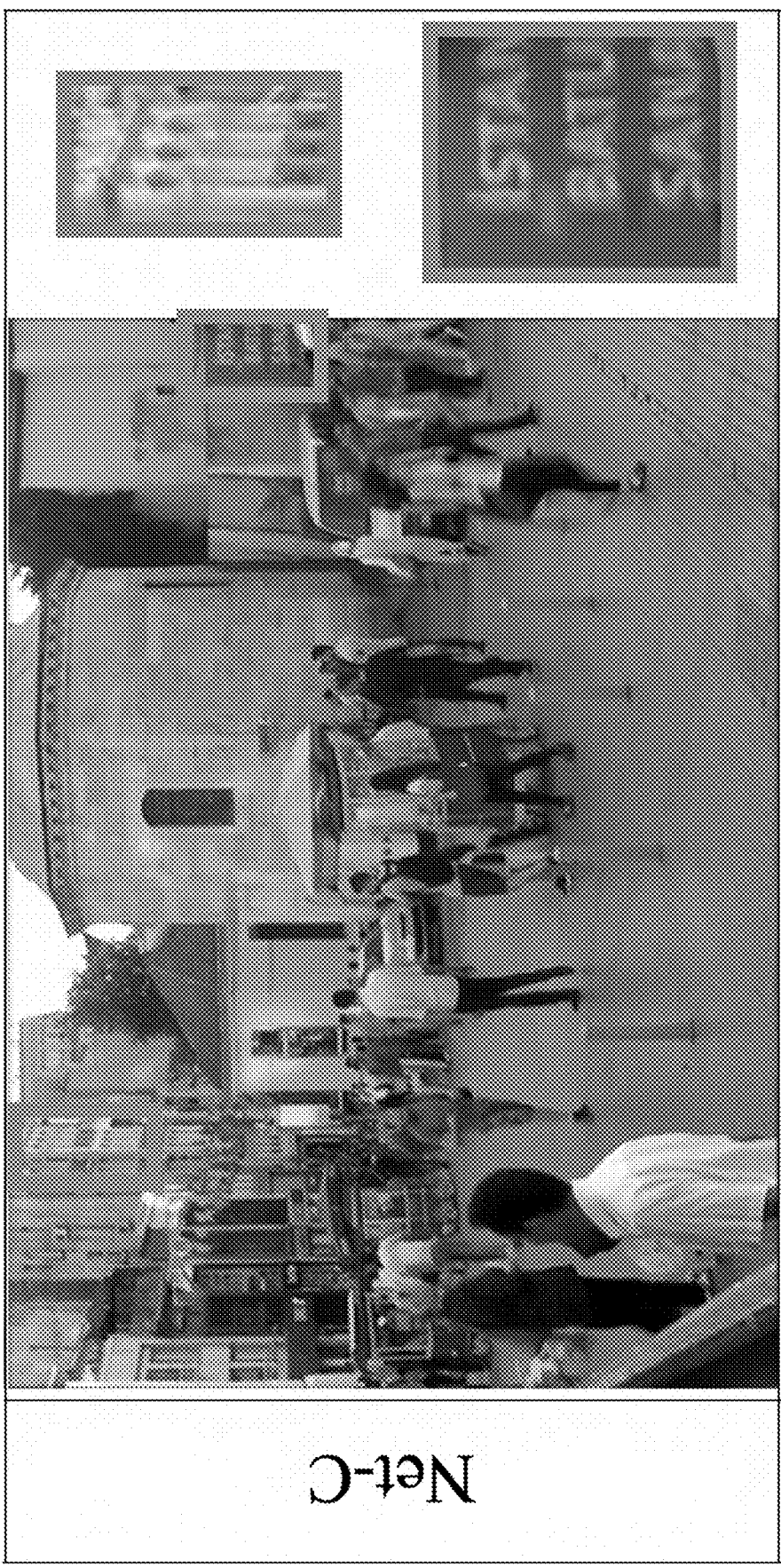
FIG. 7 shows a deblurred image generated using a method according to a third embodiment of the invention.
Figure 8:
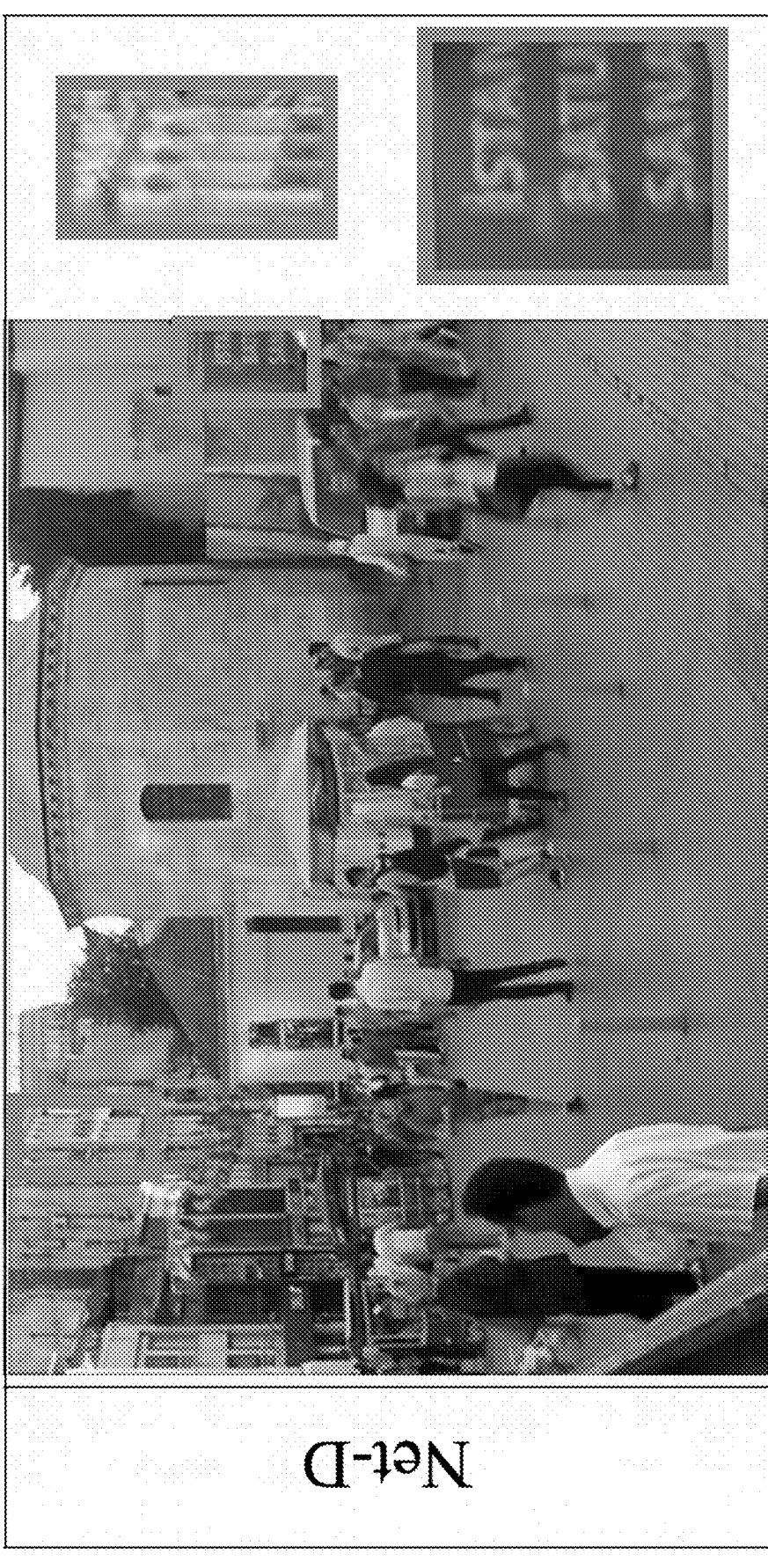
FIG. 8 shows a deblurred image generated using a method according to a fourth embodiment of the invention.
Figure 9:
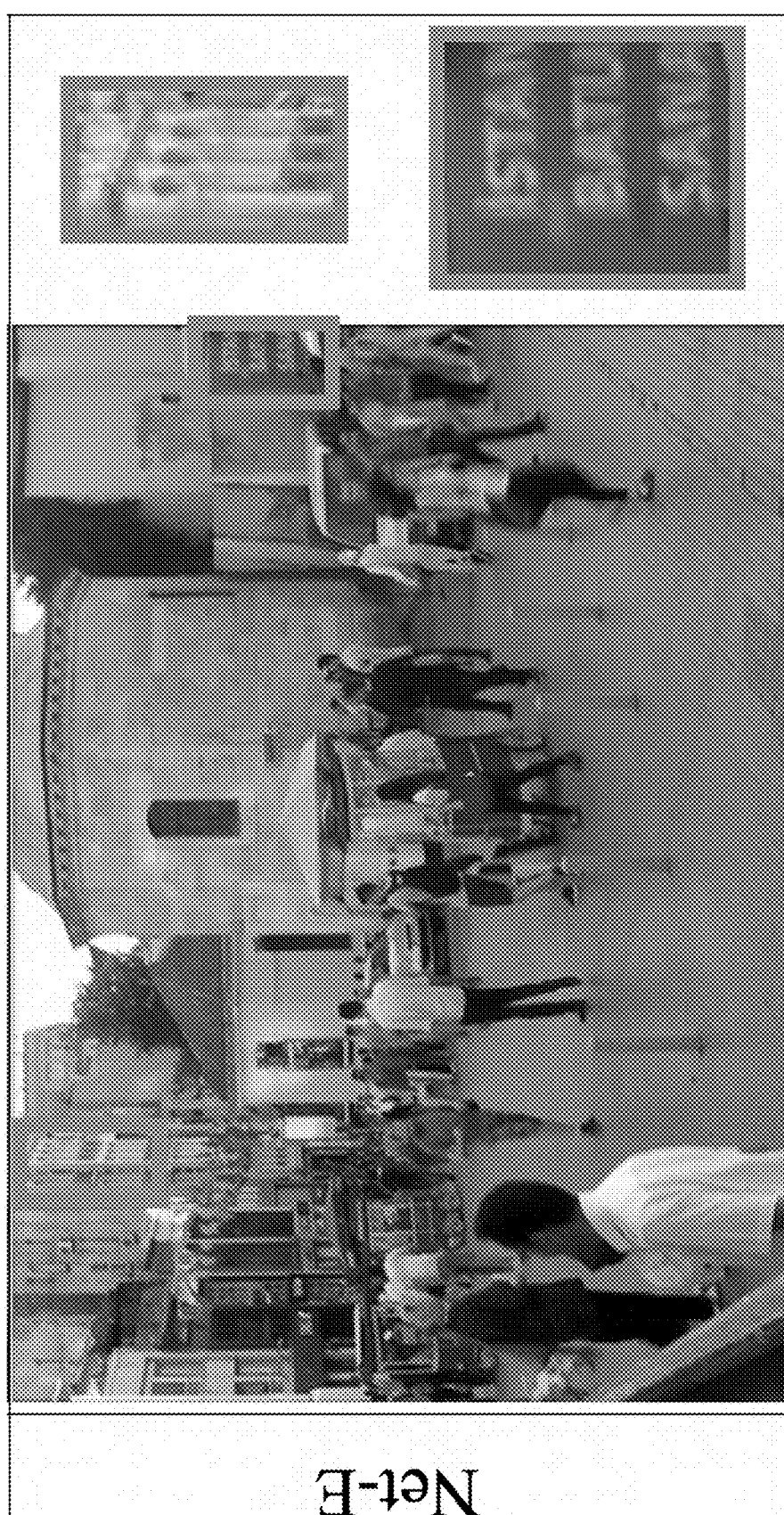
FIG. 9 shows a deblurred image generated using a method according to a fifth embodiment of the invention.
Figure 10:
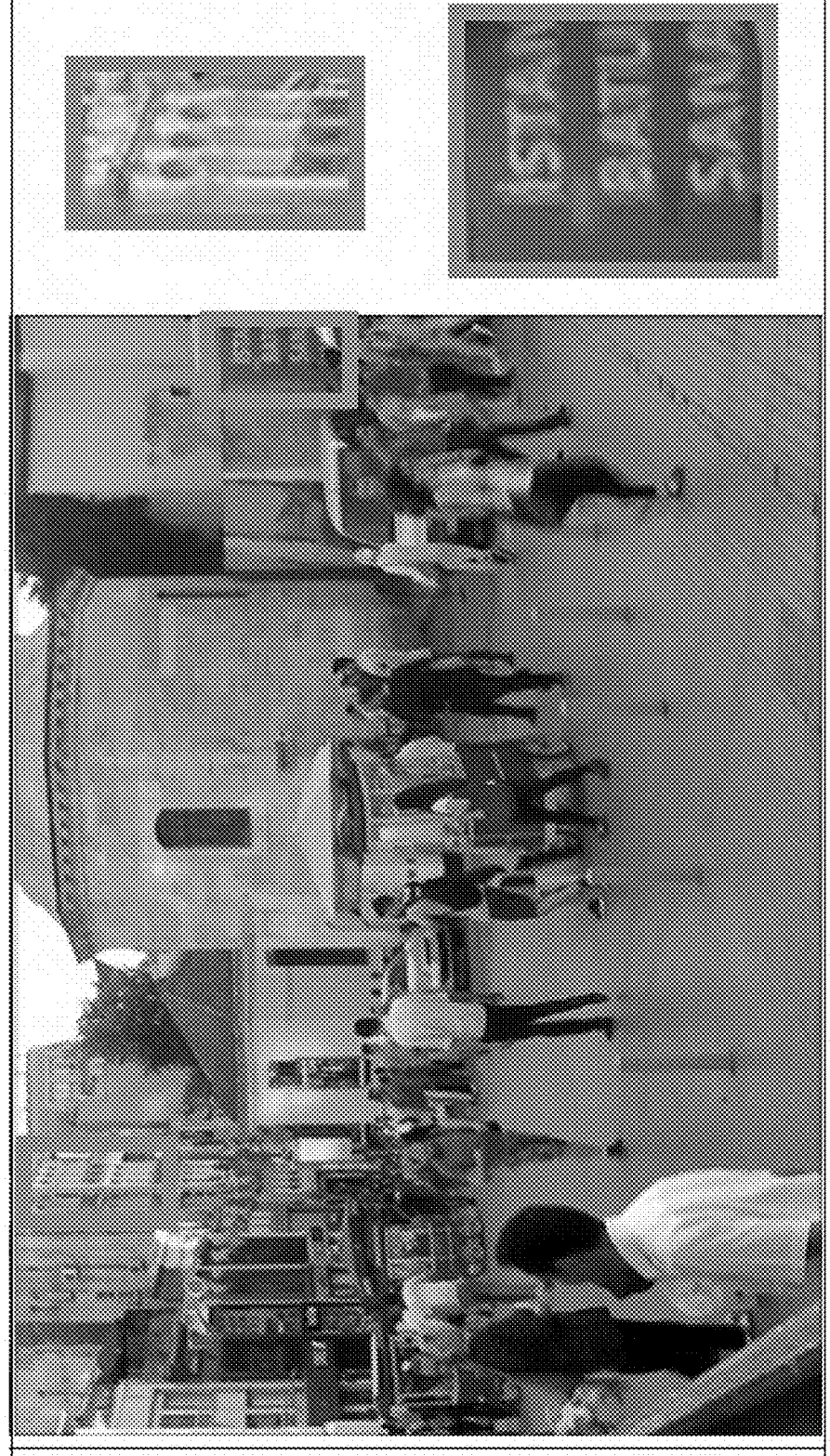
FIG. 10 shows a deblurred image generated using a method according to a sixth embodiment of the invention.

Qualitative results from Net-A through Net-F (FIGS. 5-10) are comparable to the SRN-Deblur network (FIG. 3), and also slightly sharper than that of the SRN-Deblur network. The results from Net-A (FIG. 5) and Net-B (FIG. 6) are very similar as they did perform best overall. From FIG. 2, the closeup of the result including text from SRN-Deblur (FIG. 3) looks sharper that the results from Net-A and Net-B, but the closeup of the building looks sharper in Net-A and Net-B.

Figure 4:
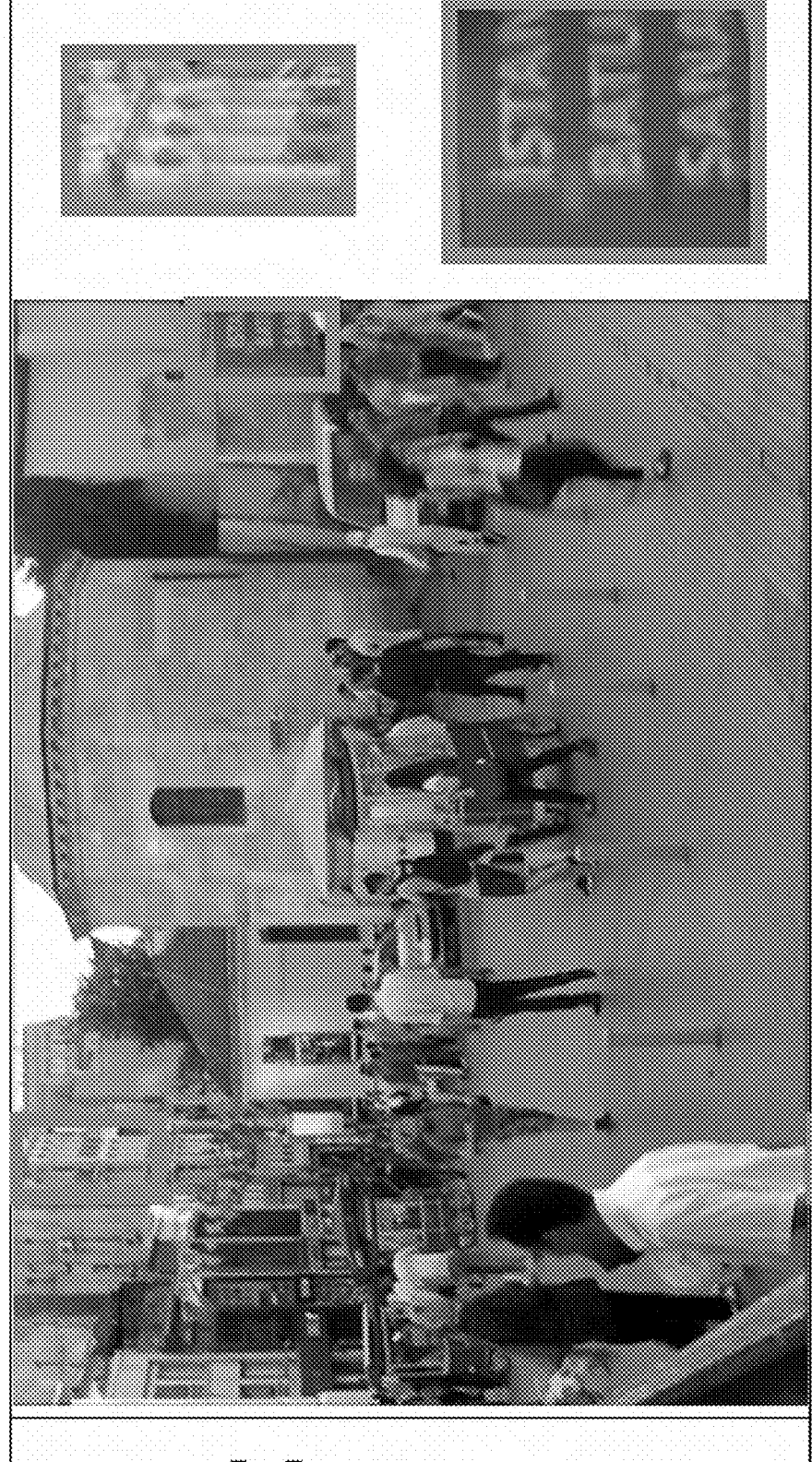
FIG. 4 shows a deblurred image generated using the DUBLID method.

Net-A through Net-F are as compact as is DUBLID (Table 5) (FIG. 4), i.e., they contain approximately 23,400 parameters, as compared to the 3.7 million parameters in the SRN-Deblur network and the millions of parameters in other deblurring neural networks. This allows for portability and

TABLE 3

| Average Kohler Dataset Results. | | | | | | | |
|---|---|---|---|---|---|---|---|
| | SRN-Deblur [13] | DUBLID [4] | Net-A | Net-B | Net-C | Net-D | Net-E | Net-F |
| PSNR | 26.75 | 29.83 | 29.73 | 29.88 | 29.90 | 29.96 | 30.10 | 30.19 |
| MSSIM | 0.837 | 0.892 | 0.889 | 0.893 | 0.892 | 0.894 | 0.895 | 0.898 |

From Table 3, it is evident that Net-F (400×400 patch size with a maximum PSF of 45×45) achieved the best overall results with the highest PSNR and SSIM values when deblurring images from the Kohler dataset. This differs from the expectation as the larger window size for Net-F specifies a wider space over which the PSF must be accurately estimated. The results from Net-E were comparable to that of Net-F even though the PSF window for this network (21×21 pixels) is smaller than some of the PSF sizes in the Kohler dataset. The networks with larger patch sizes (Net-E and Net-F with 400×400 pixel patches) performed better in general. Since deblurring of the images in the Kohler dataset was possible using a large patch size, it was determined that the blur in the Kohler dataset does not have high spatial variation. In contrast to Table 4, when deblurring images from the GOPRO dataset, the networks with the smallest patch size (Net-A and Net-B with 100×100 pixel patches) performed the best overall.

efficiency even on devices with limited computational power. According to an alternative embodiment, the patch size may be varied based on the level of spatial variation in the blurred image. This can be implemented by allowing the optimum patch size and position to be determined by blur identification, to improve blind deblurring performance.

TABLE 5

| Number of Parameters. | | | |
|---|---|---|---|
| | SRN-Deblur [13] | DUBLID [4] | Net-A-Net-F |
| Number of Trainable Parameters | ~3.76 × 10⁶ | ~2.3 × 10⁴ | ~2.3 × 10⁴ |

The invention claimed is:

1. A computer-implemented method for removing uniform or non-uniform blur from

TABLE 4

| Average GOPRO Dataset Results. | | | | | | | |
|---|---|---|---|---|---|---|---|
| | SRN-Deblur [13] | DUBLID [4] | Net-A | Net-B | Net-C | Net-D | Net-E | Net-F |
| PSNR | 30.26 | 29.6 | 30.19 | 30.27 | 29.77 | 29.65 | 29.60 | 26.17 |
| SSIM | 0.934 | 0.930 | 0.944 | 0.938 | 0.939 | 0.931 | 0.936 | 0.830 |

Net-A has the highest average SSIM and Net-B has the highest overall average PSNR The images in the GOPRO dataset are created to simulate motion blur, often with a blurred original image (Y), comprising:

a. using a processor to pass said blurred image through a first set of C 3D-convolutional filters trained on a neural network to identify image features that are characteristic of a high-resolution image and produce a first plurality of C filtered images in which potentially high-resolution features are emphasized;

b. using said processor to pass said first plurality of C filtered images through a second set of C 3D-convolutional filters trained on said neural network to identify said features to produce a second set of filtered images;

c. repeating step b with subsequent sets of 3D-convolutional filters trained on said neural network to identify said features to produce subsequent sets of filtered images until a final set of filtered images is produced following a predetermined (L) repetitions of step b;

d. using said processor to pass said final set of C filtered images (denoted $Y^1$) to a first layer of said neural network, inputting to said first layer of said neural network a plurality of delta function filters which are initial estimates of blurring filters ($K^0$), and a filtered image initial estimate ($G^0$), said first layer of said neural network generating a first set of revised estimates of the blurring filters ($K^1$) and a first layer estimate ($Z^1$) of said final set of filtered images ($Y^1$), using an overlapping patch based approach, i. wherein said first set of C revised estimates of the blurring filters ($K^1$) correspond to different, but overlapping regions of said original image (Y), which are fused/assembled into a first layer blurring filter solution, and ii. wherein said first layer of said neural network also fuses/assembles said first revised estimates of the first layer estimate ($Z^1$) of said original image (Y);

e. using said processor to pass a penultimate set of C filtered images ($Y^2$) to a second layer of said neural network, inputting to said second layer of said neural network said first set of revised estimates of the blurring filters ($K^1$) and said first set of estimates ($Z^1$), said second layer of said neural network generating a set of second revised estimates of the blurring filters ($K^2$) and a second set of estimates ($Z^2$) of said penultimate set of filtered images ($Y^2$), using said overlapping patch based approach, i. wherein said second set of revised estimates of the blurring filters ($K^2$) correspond to said different but overlapping regions of said original image (Y), and ii. wherein said second layer of said neural network fuses/assembles said second revised estimates of the blurring filter into a second layer blurring filter solution ($K^2$) and a second layer estimate ($Z^2$) of said original image (Y);

f. repeating step e with subsequent layers of said neural network a number of times corresponding to said repetitions (L) of step b to produce a final blurring filter solutions ($K^L$) and a final estimate ($Z^L$) of said original image (Y);

g. using said processor to pass said blurred original image (Y), said first set of C 3D-convolutional filters, said final blurring filter solution ($K^L$) and said final estimate ($Z^L$) of said original blurred image (Y) through an inverse filter to produce a final deblurred image (X).

2. The computer-implemented method according to claim 1, wherein no additional information concerning the original blurred image is provided to said processor.

3. The computer implemented method according to claim 1, wherein said blurred original image is processed by consecutive sets of C said 3D-convolution filters, said second set of C 3D-convolutional filters and said subsequent sets of C convolutional filters, where processed output from each said first set of 3D-convolution filters, said second set of 3D-convolutional filters and said subsequent sets of convolutional filters, is used as input to the next layer of said neural network, a. wherein a combined number of said first set of 3D convolution filters, said second set of 3D-convolutional filters and said subsequent sets of convolutional filters, is equal to a total number of filters in the neural network;

b. wherein a last set of outputs from the L said subsequent sets of C convolutional filters is passed into said first layer of the neural network, an output from a penultimate set of convolutional filters is passed to the second layer of the neural network, and so forth until the output of the first set of convolutional filters is passed to the last layer of the neural network; and c. wherein C 3D-convolution filters make up the set in each layer and there are L sets of filters, which correspond to five to twenty layers of the neural network respectively.

\* \* \* \* \*